United States Patent
Yokoyama et al.

(10) Patent No.: US 9,714,362 B2
(45) Date of Patent: Jul. 25, 2017

(54) LOW TEMPERATURE CURING COATING COMPOSITION AND USE THEREOF

(71) Applicant: AXALTA COATING SYSTEMS IP CO. LLC, Wilmington, DE (US)

(72) Inventors: Ayumu Yokoyama, Media, PA (US); Rajesh Gopalan Saliya, Wilmington, DE (US); Eric C. Houze, Mullica Hill, NJ (US); Violeta Ilieva Petkovska, Philadelphia, PA (US)

(73) Assignee: AXALTA COATING SYSTEMS IP CO. LLC, Wilmington, DE (US)

( * ) Notice: Subject to any disclaimer, the term of this patent is extended or adjusted under 35 U.S.C. 154(b) by 374 days.

(21) Appl. No.: 14/379,833

(22) PCT Filed: Jan. 29, 2013

(86) PCT No.: PCT/US2013/023587
§ 371 (c)(1),
(2) Date: Aug. 20, 2014

(87) PCT Pub. No.: WO2013/126184
PCT Pub. Date: Aug. 29, 2013

(65) Prior Publication Data
US 2015/0337167 A1    Nov. 26, 2015

Related U.S. Application Data

(60) Provisional application No. 61/601,245, filed on Feb. 21, 2012.

(51) Int. Cl.
*C09D 175/04*    (2006.01)
(52) U.S. Cl.
CPC .................. *C09D 175/04* (2013.01)
(58) Field of Classification Search
CPC .................................... C09D 175/04

USPC .......................... 427/385.5, 384; 524/99, 590
See application file for complete search history.

(56) References Cited

U.S. PATENT DOCUMENTS

| | | | |
|---|---|---|---|
| 2004/0043152 A1* | 3/2004 | Barsotti ............ | C08G 18/4063 427/283 |
| 2006/0046068 A1 | 3/2006 | Barancyk et al. | |
| 2008/0044578 A1 | 2/2008 | Bernard et al. | |
| 2011/0257330 A1 | 10/2011 | Yokoyama et al. | |
| 2011/0269884 A1 | 11/2011 | Yokoyama et al. | |

FOREIGN PATENT DOCUMENTS

EP    1511784 B1    10/2006

OTHER PUBLICATIONS

ISA Korean Intellectual Property Office, International Preliminary Report on Patentability for International Application No. PCT/US2013/023587, mailed Sep. 4, 2014.
ISA Korean Intellectual Property Office, International Search Report and Written Opinion for International Application No. PCT/US2013/023587, mailed May 15, 2013.

* cited by examiner

*Primary Examiner* — Ling Choi
*Assistant Examiner* — Chun-Cheng Wang
(74) *Attorney, Agent, or Firm* — Lorenz & Kopf LLP

(57) ABSTRACT

The present disclosure is directed to process for forming a coating layer curable at ambient temperature. This disclosure is further directed to a process for forming a coating layer using a coating composition comprising a crosslinkable component and a crosslinking component that comprises: (a) one or more alkylated melamines that are essentially unreactive to a polyisocyanate, and (b) a polyisocyanate. The process and the coating composition can be particularly suitable for vehicle coatings.

13 Claims, No Drawings

LOW TEMPERATURE CURING COATING COMPOSITION AND USE THEREOF

CROSS-REFERENCE TO RELATED APPLICATIONS

This application is a U.S. National-Stage entry under 35 U.S.C. §371 based on International Application No. PCT/US2013/023587, filed Jan. 29, 2013, which was published under PCT Article 21(2) and which claims priority to U.S. Provisional Application No. 61/601,245, filed Feb. 21, 2012, which are all hereby incorporated in their entirety by reference.

FIELD OF DISCLOSURE

The present disclosure is directed to a coating composition for producing a coating curable at ambient temperature and being quick dry and having good appearance.

BACKGROUND OF DISCLOSURE

Coating can provide one or more protective layers for the underlying substrate and can also have an aesthetically pleasing value. A typical coating finish over a substrate can comprise some or all of the following coating layers: (1) one or more primer layers that provide adhesion and basic protection, and also cover minor surface unevenness of the substrate; (2) one or more colored layers, typically pigmented, that provide most of the protection, durability and color; and (3) one or more clearcoat layers that provide additional durability and improved appearance. A colored topcoat layer can be used in place of the colored layer and clearcoat layer. These coatings can be used on buildings, machineries, equipments, vehicles as automotive original equipment manufacture (OEM) and refinish coatings, or in other coating applications.

The coatings are typically formed from coating compositions. A two package coating composition, also known as 2K coating composition, can typically comprise a crosslinkable component and a crosslinking component that can react to form crosslinked structures that can have certain coating properties, such as gloss, impact resistance, or drying time.

There are continuing needs for coating compositions that can produce coatings with improved properties.

STATEMENT OF DISCLOSURE

This disclosure is directed to a process for forming a coating layer over a substrate, said process comprising the steps of:

A1) providing a crosslinkable component comprising one or more film forming polymers having one or more crosslinkable functional groups, wherein at least one of the one or more crosslinkable functional groups is hydroxyl group, said crosslinkable component comprises in a range of from 0% to 20% of water, percentage based on the total weight of the crosslinkable component;

A2) providing a crosslinking component comprising: (a) one or more alkylated melamines that are essentially unreactive to a polyisocyanate, and (b) one or more polyisocyanates each having two or more free isocyanate crosslinking functional groups;

A3) mixing said crosslinkable component with an acid catalyst to form a catalyzed crosslinkable component;

A4) mixing said catalyzed crosslinkable component with said crosslinking component to form a coating composition;

A5) applying said coating composition over said substrate to form a wet coating layer thereon; and A6) curing said wet coating layer at a temperature in a range of from 15° C. to 60° C. to form said coating layer.

This disclosure is also directed to a substrate coated with the process disclosed herein.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

"Gloss" means surface gloss of a coating surface and is related to the amount of incident light that is reflected at the specular reflectance angle of the mean of that surface. Gloss can be measured with a specular glossmeter, such as those available from Byk-Gardener, Geretsried, Germany.

"DOI" (Distinctness of Image) is a quantitative measure of coating appearance that measures the light reflected at and around the specular reflectance angle. It can be determined according to the method described in ASTM D 5767. DOI can be measured with wave scan instruments, such as those available from Byk-Gardener, Geretsried, Germany. DOI measures not only the amount of incident light that is reflected at the specular reflectance angle, but also the distribution of the reflected light around the reflectance specular angle, typically +/−0.3° from the specular angle. A coating surface that gives fuzzy or distorted image generally produces lower DOI reading. A coating reflecting 100% of lights at the specular angle gives a DOI reading of 100.

The term "volatile organic compound", "VOC", "volatile organic compounds", or "VOCs" refers to organic chemical compounds of carbon that can vaporize and enter the atmosphere and participate in atmospheric photochemical reactions. VOCs can be naturally occurring or produced from natural or synthetic materials. Some or all VOCs can be regulated under local, national, regional, or international authorities. VOC can be expressed as weight of VOC on a unit of volume of a product, such as pounds per gallon (lbs/gal). Amounts of VOC in a coating composition can be determined according to ASTM D3960.

The term "two-pack coating composition", also known as 2K coating composition, refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The pot mix is then applied as a layer of a desired thickness on a substrate surface, such as an automobile body. After application, the layer dries and cures at ambient or at elevated temperatures to form a coating on the substrate surface having desired coating properties, such as, adhesion, high gloss, and high DOI.

The term "crosslinkable component" refers to a component having "crosslinkable functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The term "crosslinking component" refers to a component having "crosslinking functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide or a workable combination thereof.

It would be clear to one of ordinary skill in the art that certain crosslinking functional groups crosslink with certain crosslinkable functional groups. Examples of paired combinations of crosslinkable and crosslinking functional groups can include: (1) amine and protected amine such as ketimine and aldimine functional groups generally crosslink with acetoacetoxy, epoxy, or anhydride functional groups; (2) isocyanate, thioisocyanate and melamine functional groups generally crosslink with hydroxyl, thiol, primary and secondary amine, ketimine, or aldimine functional groups; (3) epoxy functional groups generally crosslink with carboxyl, primary and secondary amine, ketimine, aldimine or anhydride functional groups; and (4) carboxyl functional groups generally crosslink with epoxy or isocyanate functional groups.

The term "binder" as used herein refers to film forming constituents of a coating composition. Typically, a binder can comprise a crosslinkable component and a crosslinking component in that the crosslinkable component can react with the crosslinking component to form crosslinked structures, such as coating films. The binder used herein can further comprise other polymers, compounds or molecules that are essential for forming crosslinked coatings having desired properties, such as good adhesion, high DOI and free of sagging at high coating thicknesses. Additional components, such as solvents, pigments, catalysts, rheology modifiers, antioxidants, UV stabilizers and absorbers, leveling agents, antifoaming agents, anti-cratering agents, or other conventional additives are not included in the term. One or more of those additional components can be included in the coating composition of this invention.

This disclosure is directed to a process for forming a coating layer over a substrate. The process can comprise the steps of:

A1) providing a crosslinkable component comprising one or more film forming polymers having one or more crosslinkable functional groups, wherein at least one of the one or more crosslinkable functional groups is hydroxyl group, said crosslinkable component comprises in a range of from 0% to 20% of water, percentage based on the total weight of the crosslinkable component;

A2) providing a crosslinking component comprising: (a) one or more alkylated melamines that are essentially unreactive to a polyisocyanate, and (b) one or more polyisocyanates each having two or more free isocyanate crosslinking functional groups;

A3) mixing said crosslinkable component with an acid catalyst to form a catalyzed crosslinkable component;

A4) mixing said catalyzed crosslinkable component with said crosslinking component to form a coating composition;

A5) applying said coating composition over said substrate to form a wet coating layer thereon; and A6) curing said wet coating layer at a temperature in a range of from 15° C. to 60° C. to form said coating layer.

The alkylated melamines need to be essentially unreactive to a polyisocyanate. To be "essentially unreactive", a mixture of the one or more melamines and the polyisocyanate must stay un-gelled for at least 5 hours from the time of mixing and the viscosity of the mixture remains below 150% of the initial viscosity for at least 2 hours from the time of mixing at ambient temperatures such as a temperature in a range of from 15° C. to 60° C., wherein the initial viscosity is the viscosity of the mixture measured immediately after the one or more melamines and the polyisocyanate are just mixed. The measurement needs to be done under conditions to minimize the evaporation of solvents from the mixture to minimize viscosity change caused by the loss of solvents. The polyisocyanate can be a diisocyanate monomer, diisocyanate dimer, diisocyanate trimer, tri-functional isocyanates, trimers of tri-functional isocyanates, or a combination thereof. The mixture can have a weight ratio of the melamine and the polyisocyanate in a range of from 5:1 to 1:5. In one example, a melamine can be tested for its reactivity towards a polyisocyanate by mixing 1 weight part of the melamine and 1 weight part of a polyisocyanate, such as 1,6-hexamethylene diisocyanate ("HDI") trimer and measuring the viscosity of the mixture at 0, 2 and 5 hour time points from mixing at ambient temperatures. The melamine can be determined as essentially unreactive to a polyisocyanate if the mixture is not gelled and the viscosity at 2 hour time point remains less than 150% of the initial viscosity measured at 0 hour time point. The alkylated melamines can be essentially unreactive to 1,6-hexamethylene diisocyanate ("HDI") monomer or trimer.

Any melamines that are essentially unreactive to a polyisocyanate can be suitable. In one example, the suitable melamine can include Cymel® XW-3106, commercially available under respective registered trademark or trademark from Cytec Industries, Inc., Wallingford, Conn. 06492, USA. The alkylated melamine can include alkylated melamine aldehyde condensation products or derivatives, such as alkylated melamine formaldehyde. In one example, the alkylated melamines that are essentially unreactive to a polyisocyanate can include fully alkylated melamines that are essentially free from isocyanate reactive H, such as —OH, —NH, —NH$_2$, or a combination thereof. The term "essentially free from isocyanate reactive H" means that the alkylated melamine can have minor amounts of functional groups having the isocyanate reactive H, such as —OH, —NH, —NH$_2$, or a combination thereof, and a mixture of the alkylated melamine and the polyisocyanate does not form gel and the crosslinking component can remain in a low viscosity range suitable for coating applications, such as mixing with a crosslinkable component for spraying, rolling, brushing, dipping, draw-down, or a combination thereof. The alkylated melamine can have in a range of from 0% to 10% in one example, 0% to 5% in another example, 0% to 1% in yet another example, 0% to 0.1% in yet another example, of melamine that have functional groups having the isocyanate reactive H, percentage based on the total weight of melamine in the crosslinking component. The crosslinking component can have in a range of from 0% to 10% in one example, 0% to 5% in another example, 0% to 1% in yet another example, 0% to 0.1% in yet another example, of melamines having —OH, —NH, —NH$_2$ groups, or a combination thereof, percentage based on the total weight of melamine in the crosslinking component.

The alkylated melamine can be formed by first reacting with one or more C1-C5 aldehydes to form alcohols, and then react with one or more C1-C10 alkylation agents. The alkylated melamine can comprise alkylation groups selected from one or more C1-C10 alkyls. In one example, the alkylated melamine can comprise methyl groups. In another example, the alkylated melamine can comprise butyl groups. In yet another example, the alkylated melamine can comprise a combination of methyl and butyl groups. A melamine having all amine groups alkylated is referred to as a fully alkylated melamine. Examples of fully alkylated melamine can include hexamethoxymethylmelamine (HMMM) and melamines having butoxymethyl groups, ethoxymethyl groups, methoxymethyl groups, or a combination thereof.

When a melamine is not essentially unreactive to a polyisocyanate, such as a melamine contains the isocyanate reactive H, for example —NH or —NH$_2$, over the range specified above, the mixture of the melamine and the polyisocyanate can react leading to undesired products or properties such high viscosity or gelling.

The acid catalyst can be one or more strong acids. In one example, the acid catalyst can be selected from dodecyl benzene sulfonic acid (also referred to as "DDBSA"), dinonylnaphtalene sulfonic acid, or a combination thereof.

The process can further comprise the steps of mixing one or more additives into said crosslinkable component, said crosslinking component, said coating composition, or a combination thereof. The additives can be selected from pigments, one or more solvents, ultraviolet light stabilizers, ultraviolet light absorbers, antioxidants, hindered amine light stabilizers, leveling agents, rheological agents, thickeners, antifoaming agents, wetting agents, or a combination thereof, In one example, one or more of the additives can be mixed into the crosslinkable component. In another example, one or more of the additives can be mixed into the crosslinking component. In yet another example, one or more of the additives can be mixed into the coating composition after the crosslinkable component and the crosslinking component are mixed to form the coating composition.

The film forming polymers can be selected from acrylic polymers, polyester polymers, polyurethane polymers, alkyd resins, or a combination thereof. Typical polymers suitable for coating compositions can be suitable.

The acrylic polymers can have a weight average molecular weight (Mw) of about 1,500 to 100,000, and contain crosslinkable functional groups, such as, for example, hydroxyl, amino, amide, glycidyl, silane and carboxyl groups. The acrylic polymers can be linear polymers, branched polymers, or other polymers. The acrylic polymers can be polymerized from a plurality of monomers, such as acrylates, methacrylates or derivatives thereof. Suitable monomers can include linear alkyl(meth)acrylates having 1 to 12 carbon atoms in the alkyl group, cyclic or branched alkyl(meth)acrylates having 3 to 12 carbon atoms in the alkyl group. Suitable monomers can also include, for example, hydroxyalkyl esters of alpha,beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. Suitable monomers can also include monomers that are reaction products of alpha, beta-unsaturated monocarboxylic acids with glycidyl esters of saturated monocarboxylic acids branched in alpha position, for example with glycidyl esters of saturated alpha-alkylalkanemonocarboxylic acids or alpha,alpha'-dialkylalkanemonocarboxylic acids. These can comprise the reaction products of (meth)acrylic acid with glycidyl esters of saturated alpha,alpha-dialkylalkanemonocarboxylic acids with 7 to 13 carbon atoms per molecule, particularly preferably with 9 to 11 carbon atoms per molecule. These reaction products can be formed before, during or after copolymerization reaction of the acrylic polymer. Suitable monomers can further include monomers that are reaction products of hydroxyalkyl(meth)acrylates with lactones. Hydroxyalkyl (meth)acrylates which can be used include, for example, those stated above. Suitable lactones can include, for example, those that have 3 to 9 carbon atoms in the ring, wherein the rings can also comprise different substituents. The hydroxyl groups of the hydroxyalkyl esters can be modified with the lactone before, during or after the copolymerization reaction. Suitable monomers can also include unsaturated monomers such as, for example, allyl glycidyl ether, 3,4-epoxy-1-vinylcyclohexane, epoxycyclohexyl (meth)acrylate, vinyl glycidyl ether and glycidyl(meth)acrylate, that can be used to provide the acrylic polymer with glycidyl groups. In one example, glycidyl(meth)acrylate can be used. Suitable monomers can also include monomers that are free-radically polymerizable, olefinically unsaturated monomers which, apart from at least one olefinic double bond, do not contain additional functional groups. Such monomers include, for example, esters of olefinically unsaturated carboxylic acids with aliphatic monohydric branched or unbranched as well as cyclic alcohols with 1 to 20 carbon atoms. Suitable monomers can also include unsaturated monomers that do not contain additional functional groups for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers can include styrene, alpha-methylstyrene, chlorostyrenes, 2,5-dimethylstyrene, p-methoxystyrene, vinyl toluene. In one embodiment, styrene can be used. Suitable monomers can also include small proportions of olefinically polyunsaturated monomers. These olefinically polyunsaturated monomers are monomers having at least 2 free-radically polymerizable double bonds per molecule. Examples of these olefinically polyunsaturated monomers can include divinylbenzene, 1,4-butanediol diacrylate, 1,6-hexanediol diacrylate, neopentyl glycol dimethacrylate, and glycerol dimethacrylate.

The acrylic polymers of this disclosure can generally be polymerized by free-radical copolymerization using conventional processes well known to those skilled in the art, for example, bulk, solution or bead polymerization, in particular by free-radical solution polymerization using free-radical initiators.

The acrylic polymer can contain (meth)acrylamides. Typical examples of such acrylic polymers can be polymerized from monomers including (meth)acrylamide. In one example, such acrylic polymer can be polymerized from (meth)acrylamide and alkyl(meth)acrylates, hydroxy alkyl (meth)acrylates, (meth)acrylic acid and one of the aforementioned olefinically unsaturated monomers.

The acrylic polymers can have one or more crosslinkable functional groups. At least one of the one or more crosslinkable functional groups can be a hydroxyl group.

The polyester polymers can be linear polyesters or copolyesters, branched polyesters or copolyesters, highly branched polyesters or copolyesters, or a combination thereof. The highly branched copolyester can have a hydroxyl number in a range of from 5 to 200 and can have a weight average molecular weight in a range of from 1,000 to 50,000.

The polyester polymers can have one or more crosslinkable functional groups. At least one of the one or more crosslinkable functional groups can be a hydroxyl group.

Polyurethane polymers can be suitable for the coating composition of this disclosure. Examples of polyurethane polymers can include acrylourethanes. Typical useful acrylourethanes can be formed by reacting the aforementioned acrylic polymers with an organic polyisocyanate. Generally, an excess of the acrylic polymer is used so that the resulting acrylourethane can have terminal acrylic segments having reactive groups such as crosslinkable functional groups such as hydroxyl, carboxyl, amine, glycidyl, amide, silane, or acombination thereof. At least one of the one or more crosslinkable functional groups can be a hydroxyl group.

Suitable alkyd resins can include esterification products. Examples can include esterification products of a drying oil fatty acid, such as linseed oil and tall oil fatty acid, dehydrated castor oil, a polyhydric alcohol, a dicarboxylic acid and an aromatic monocarboxylic acid.

Examples of polyisocyanates can include aliphatic polyisocyanates, cycloaliphatic polyisocyanates, aromatic polyisocyanates and isocyanate adducts. Examples of suitable aliphatic, cycloaliphatic and aromatic polyisocyanates that can include: 2,4-toluene diisocyanate, 2,6-toluene diisocyanate ("TDI"), 4,4-diphenylmethane diisocyanate ("MDI"), 4,4'-dicyclohexyl methane diisocyanate ("H12MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as Tolonate® HDT from Rhodia Corporation and the trimer of isophorone diisocyanate are also suitable.

An isocyanate functional adduct can be used, such as, an adduct of an aliphatic polyisocyanate and a polyol or an adduct of an aliphatic polyisocyanate and an amine. Also, any of the aforementioned polyisocyanates can be used with a polyol to form an adduct. Polyols, such as, trimethylol alkanes, particularly, trimethylol propane or ethane can be used to form an adduct.

The weight ratio of the one or more melamine:the polyisocyanates can be in a range of from 1:0.1 to 1:10.

The coating composition can further comprise one or more pigments, one or more solvents, ultraviolet light stabilizers, ultraviolet light absorbers, antioxidants, hindered amine light stabilizers, leveling agents, rheological agents, thickeners, antifoaming agents, wetting agents, catalysts, or a combination thereof.

The crosslinkable component is solvent borne comprising organic solvents. Examples of organic solvents can include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate, and a combination thereof. The crosslinkable component can comprise in a range of from 0% to 20% of water. Typically the crosslinkable component can comprise in a range of from 0% to 20% in one example, 0% to 10% in another example, 0% to 5% in yet another example, and 0% to 1% in yet another example, of water, percentage based on the total weight of the crosslinkable component.

The coating composition can comprises to 80% by weight, based on the weight of the coating composition, of one or more solvents. Typically, the coating composition can have a solid content in a range of from 20% to 80% by weight in one example, in a range of from 50% to 80% by weight in another example and in a range of from 60% to 80% by weight in yet another example, all based on the total weight of the coating composition. One or more of organic solvents can be added to the coating composition to adjust properties, such as viscosity. The coating composition can comprise in a range of from 0% to 20% of water. Typically, the coating composition can comprise in a range of from 0% to 20% in one example, 0% to 10% in another example, 0% to 5% in yet another example, and 0% to 1% in yet another example, of water.

The coating composition of this invention can be formulated as a clearcoat or pigmented coating composition. The coating composition can be used as a primer, a basecoat, topcoat, such as colored topcoat. Conventional inorganic and organic colored pigments, metallic flakes and powders, such as, aluminum flake and aluminum powders; special effects pigments, such as, coated mica flakes, coated aluminum flakes colored pigments, or a combination thereof can be used. Transparent pigments or pigments having the same refractive index as the cured binder can also be used. One example of such transparent pigment can be silica.

The coating composition of this invention can also comprise one or more ultraviolet light stabilizers in the amount of 0.1% to 10% by weight, based on the weight of the binder. Examples of such ultraviolet light stabilizers can include ultraviolet light absorbers, screeners, quenchers, and hindered amine light stabilizers. An antioxidant can also be added to the coating composition, in the amount of about 0.1% to 5% by weight, based on the weight of the binder.

Typical ultraviolet light stabilizers that are suitable for this invention can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals, Tarrytown, N.Y., under respective registered trademark, can be used.

Typical ultraviolet light absorbers that are suitable for this invention can include hydroxyphenyl benzotriazoles, such as, 2-(2-hydroxy-5-methylphenyl)-2H-benzotriazole, 2-(2-hydroxy-3,5-di-tertamyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2-hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Typical hindered amine light stabilizers can include N-(1,2,2,6,6-pentamethyl-4-piperidinyl)-2-dodecyl succinimide, N-(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N,N'-dibutyl-N',N'-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl)methyl]butyl propanedioate, 8-acetyl-3-dodecyl-7,7,9,9-tetramethyl-1,3,8-triazaspiro(4,5)decane-2,4-dione, and dodecyl/tetradecyl-3-(2,2,4,4-tetramethyl-21-oxo-7-oxa-3,20-diazal dispiro(5.1.11.2)henicosan-20-yl)propionate.

Typical antioxidants that are suitable for this invention can include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl)phosphite, 1,3,5-tris(3,5-di-tert-butyl-4-hydroxybenzyl)-1,3,5-triazine-2,4,6(1H,3H,5H)-trione and benzenepropanoic acid, 3,5-bis(1,1-dimethyl-ethyl)-4-hydroxy-C7-C9 branched alkyl esters. Typically useful antioxidants can also include hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

The coating composition can further comprise additional catalysts that can be selected from organic metal salts, such as, dibutyl tin dilaurate, dibutyl tin diacetate, dibutyl tin dichloride, dibutyl tin dibromide, zinc naphthenate; compounds containing tertiary amino groups, such as, triethylamine; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts and other catalysts, or a combination thereof.

The coating compositions of this invention can comprise conventional coating additives. The aforementioned additives or a combination thereof can be suitable. Further examples of such coating additives can include wetting agents, leveling and flow control agents, for example, Resiflow®S (polybutylacrylate), BYK® 320 and 325 (high molecular weight polyacrylates), BYK® 347 (polyether-modified siloxane) under respective registered trademarks, leveling agents based on (meth)acrylic homopolymers; rheological control agents, such as highly disperse silica, or fumed silica; thickeners, such as partially crosslinked polycarboxylic acid or polyurethanes; and antifoaming agents. The additives are used in conventional amounts familiar to those skilled in the art.

The coating composition of this invention can be formulated as a two-pack (2K) coating composition. In a typical two-pack coating composition comprising two packages, the two packages are mixed together shortly before application. The first package typically can contain the crosslinkable component. Optionally, one or more pigments can be dispersed in the first package using conventional dispersing techniques, for example, ball milling, sand milling, and attritor grinding. The first package can also comprise one or more solvents. The second package can contain the crosslinking component, and optionally, one or more solvents. When present, the additional catalysts and other additives can be added in either the first or the second package prior to mixing. Alternatively, the catalysts and other additives can be added immediately after the first and the second packages are mixed together and before the coating composition is applied to a substrate or cured. In a further example, the catalysts can be mixed into the coating composition during coating application, such as during spraying.

The coating composition can be further adjusted to spray viscosity with organic solvents as determined by those skilled in the art before being applied over the substrate.

The substrate can be any articles or objects that can be coated with a coating composition. The substrate can include a vehicle, parts of a vehicle, or a combination thereof. The coating composition according to the disclosure can be suitable for vehicle and industrial coating and can be applied using known processes. In the context of vehicle coating, the coating composition can be used both for vehicle original equipment manufacturing (OEM) coating and for repairing or refinishing coatings of vehicles and vehicle parts. Curing of the coating composition can be accomplished at ambient temperatures, such as temperatures in a range of from 15° C. to 60° C.

This disclosure is further directed to a substrate coated by the aforementioned process. Examples of coated substrate can include, but not limited to: home appliances, such as refrigerator, washing machine, dishwasher, microwave ovens, cooking and baking ovens; electronic appliances, such as television sets, computers, electronic game sets, audio and video equipment; recreational equipment, such as bicycles, ski equipment, all terrain vehicles; and home or office furniture, such as tables, file cabinets. In one example, the coated substrate is a vehicle or parts of a vehicle.

Applicants unexpectedly discovered that by using the mixture of alkylated melamine and polyisocyanates, coating layer can have improved gloss, higher impact resistance and less reflection haze.

Testing Procedures

Dry Film Thickness—test method ASTM D4138

Viscosity—can be measured using (1) Zahn Viscosity as determined using a #1 Zahn cup according to ASTM D 1084 Method D; (2) Gardner-Holdt Letter scale according to ASTM D1545; or (3) Brookfield viscometer; as specified.

Tg (glass transition temperature) of a polymer is determined according to ASTM D-3418 (1988) or calculated according to the Fox Equation.

Molecular weights Mw and Mn and the polydispersity (Mw/Mn) of the acrylic polymer and other polymers are determined by GPC (Gel Permeation Chromatography) using polystyrene standards and tetrahydrofuran as the solvent.

Dry to touch time—Dry to touch time is determined by ASTM D1640.

Tack Free Time—Tack free time was determined with Mechanical Test Method according to ASTM D 1640-95. The mechanical test method was originally described in U.S. Pat. No. 2,406,989.

Reflection haze is determined according to ASTM E430. The value can be in a range of from 0 to 100, lower value being less haze.

DOI—Instrumental measurement of distinctness of Image (DOI) gloss of coating surfaces is determined according to ASTM D 5767.

Gloss—measured with standard test method for specular gloss according to ASTM D 523.

In the following examples, all parts and percentages are on a weight basis unless otherwise indicated. "Mw" weight average molecular weight and "Mn" means number average molecular weight.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Coating Compositions

Coating compositions were prepared according to Table 1 by first preparing the Pack 1 and Pack 2 separately and then mixing the Pack 1 and Pack 2 immediately prior to applying the coating composition over the substrate.

TABLE 1

Coating Compositions (in weight grams).

|  | Comp Ex | Example |
|---|---|---|
| Pack 1: | | |
| Crosslinkable Component [1] | 40 | 40 |
| Acid Catalyst [2] | 1.5 | 1.5 |
| Pack 2: | | |
| Alkylated melamine [3] | 10 | 5 |
| Polyisocyanate [4] | 0 | 5 |
| Total | 51.5 | 51.5 |

[1] The crosslinkable component used was Imron ® Plus Black 33-24926 ™ available under respective registered trademark or trademark from E. I. DuPont de Nemours and Company, Wilmington, DE, USA. Imron ® Plus Black 33-24926 ™ contains less than 1% of water.
[2] The acid catalyst used was DDBSA Catalyst CYCAT ® 600 available under respective registered trademark or trademark from Cytec Industries, Inc., Wallingford, CT 06492, USA.
[3] The alkylated melamine used was Cymel ® XW-3106, available under respective registered trademark or trademark from Cytec Industries, Inc., Wallingford, CT 06492, USA. Cymel ® XW-3106 is unreactive to 1,6-hexamethylene diisocyanate ("HDI") trimer under the conditions disclosed herein.
[4] The polyisocyanate used was 9T00-A ® available under respective registered trademark or trademark from E. I. DuPont de Nemours and Company, Wilmington, DE, USA.

Coating Properties

The coating compositions were applied on 4×12" cold rolled steel panels coated with Ecoat available as ACT CRS B952 Powercron 590 Ecoat from ACT Test Pannels LLC, Hillsdale, Mich., USA, using wet draw down and cured at 75° F. to form a dry coating layer at a thickness of about 2 mils.

Coating property data are shown in Table 2. The data indicated that the coating composition of this disclosure (Example) had improved gloss at 60°, higher impact resistance, and less reflection haze.

TABLE 2

| Coating Properties. | | |
|---|---|---|
| | Comp Ex | Example |
| Dry to Touch Time (hour) [5] | 3 | 3 |
| Impact Resistance (inch-pounds) [6] | 30 | 40 |
| Gloss at 60° [7] | 90 | 93 |
| Reflection Haze [8] | 20 | 5 |
| Adhesion to Ecoat [9] | 5 | 5 |

[5] According to ASTM D1640.
[6] According to ASTM D2794.
[7] According to ASTM D523.
[8] According to ASTM E430.
[9] According to ASTM D3359.

What is claimed is:

1. A process for forming a coating layer over a substrate, said process comprising the steps of:
   providing a crosslinkable component comprising a film forming polymer having a crosslinkable functional group, wherein the crosslinkable functional group is a hydroxyl group, and wherein the crosslinkable component comprises in a range of from 0% to about 20% of water, percentage based on the total weight of the crosslinkable component;
   mixing an alkylated melamine that is essentially unreactive to a polyisocyanate, and a polyisocyanate having two or more free isocyanate crosslinking functional groups to form a crosslinking component in the form of an un-gelled mixture;
   mixing said crosslinkable component with an acid catalyst to form a catalyzed crosslinkable component;
   mixing said catalyzed crosslinkable component with said crosslinking component to form a coating composition;
   applying said coating composition over said substrate to form a wet coating layer thereon; and
   curing said wet coating layer at a temperature in a range of from about 15° C. to about 60° C. to form said coating layer.

2. The process of claim 1, wherein the film forming polymer is selected from acrylic polymers, polyester polymers, polyurethane polymers, alkyd resins, or a combination thereof.

3. The process of claim 1, wherein the alkylated melamine comprises an alkylation group selected from C1-C10 alkyls.

4. The process of claim 1 further comprising mixing a pigment, a solvent, an ultraviolet light stabilizer, an ultraviolet light absorber, an antioxidant, a hindered amine light stabilizer, a leveling agent, a rheological agent, a thickener, an antifoaming agent, a wetting agent, or a combination thereof, into said crosslinkable component or said coating composition.

5. The process of claim 1, wherein the weight ratio of melamine: polyisocyanate is in a range of from about 1:0.1 to about 1:10.

6. A coating composition kit comprising:
   a crosslinkable component comprising a film forming polymer having a crosslinkable functional group, wherein the crosslinkable functional group is a hydroxyl group, wherein the crosslinkable component comprises in a range of from 0% to about 20% of water, percentage based on the total weight of the crosslinkable component, and wherein the crosslinkable component is contained in a first package;
   a crosslinking component in the form of an un-gelled mixture comprising an alkylated melamine that is essentially unreactive to a polyisocyanate, and a polyisocyanate having two or more free isocyanate crosslinking functional groups, wherein the crosslinking component is contained in a second package separate from the first package; and
   an acid catalyst contained in the first package, the second package or in a third package separate from the first package and second package,
   wherein contents of the first package, contents of the second package and contents of the third package are combined to form a coating composition before the coating composition is applied to a substrate.

7. The coating composition kit of claim 6, wherein the first package further contains a pigment.

8. The coating composition kit of claim 6, wherein the first package further contains a solvent.

9. The coating composition kit of claim 6, wherein the second package further contains a solvent.

10. The coating composition kit of claim 6, wherein the film forming polymer is selected from acrylic polymers, polyester polymers, polyurethane polymers, alkyd resins, or a combination thereof.

11. The coating composition kit of claim 6, wherein the alkylated melamine comprises an alkylation group selected from C1-C10 alkyls.

12. The coating composition kit of claim 6, wherein the first and/or second package further contains a pigment, a solvent, an ultraviolet light stabilizer, an ultraviolet light absorber, an antioxidant, a hindered amine light stabilizer, a leveling agent, a rheological agent, a thickener, an antifoaming agent, a wetting agent, or a combination thereof, into said crosslinkable component or said coating composition.

13. The coating composition kit of claim 6, wherein the weight ratio of melamine: polyisocyanate is in a range of from about 1:0.1 to about 1:10.

* * * * *